(12) United States Patent
Burger et al.

(10) Patent No.: US 12,306,415 B2
(45) Date of Patent: May 20, 2025

(54) IMAGING DEVICE FOR A MEDICAL IMAGING SYSTEM, MEDICAL IMAGING SYSTEM AND METHOD FOR GENERATING MEDICAL IMAGES

(71) Applicant: BHS Technologies GmbH, Innsbruck (AT)

(72) Inventors: Gregor Burger, Völs (AT); Raffael Rabl, Innsbruck (AT); Mark Capelli, Innsbruck (AT); Michael Santek, Götzens (AT)

(73) Assignee: BHS Technologies GmbH, Innsbruck (AT)

( * ) Notice: Subject to any disclaimer, the term of this patent is extended or adjusted under 35 U.S.C. 154(b) by 538 days.

(21) Appl. No.: 17/700,543

(22) Filed: Mar. 22, 2022

(65) Prior Publication Data

US 2022/0299784 A1 Sep. 22, 2022

(30) Foreign Application Priority Data

Mar. 22, 2021 (EP) ..................................... 21164041

(51) Int. Cl.
*G02B 26/08* (2006.01)
*G02B 5/20* (2006.01)
*G02B 27/10* (2006.01)
*G02B 27/14* (2006.01)

(52) U.S. Cl.
CPC ......... *G02B 27/1013* (2013.01); *G02B 5/201* (2013.01); *G02B 27/1066* (2013.01); *G02B 27/141* (2013.01)

(58) Field of Classification Search
CPC ................ G02B 27/1013; G02B 5/201; G02B 27/1066; G02B 27/141; H04N 1/028; H04N 1/02805; H04N 1/2034; H04N 1/387; H04N 1/486; H04N 1/488; H04N 1/00127; A61B 5/0071; A61B 5/0059; A61B 5/0075
See application file for complete search history.

(56) References Cited

U.S. PATENT DOCUMENTS

| | | |
|---|---|---|
| 2011/0087111 A1 | 4/2011 | Ntziachristos |
| 2015/0018690 A1 | 1/2015 | Kang et al. |
| 2018/0278857 A1* | 9/2018 | Ohishi .................. G02B 5/201 |
| 2021/0044736 A1 | 2/2021 | Kaneko |

OTHER PUBLICATIONS

Charalampaki et al. "5-Aminolevulinic acid Multispectral Imaging for the Fluorescence-Guided Resection of Brain Tumors: A Prospective Observational Study", Frontiers in Oncology, 10: 1069-1-106910, Jul. 8, 2020.

* cited by examiner

*Primary Examiner* — Euncha P Cherry

(57) ABSTRACT

The present invention relates to an imaging device (1) for a medical imaging system (100), comprising:
at least one first photosensitive imaging member (10),
at least one second photosensitive imaging member (20), and
an optical element (30),
wherein the optical element (30) is configured to route an incoming image to the first photosensitive imaging member (10) and/or the second photosensitive imaging member (20).

26 Claims, 1 Drawing Sheet

IMAGING DEVICE FOR A MEDICAL IMAGING SYSTEM, MEDICAL IMAGING SYSTEM AND METHOD FOR GENERATING MEDICAL IMAGES

RELATED APPLICATION

This application claims the benefit of priority of European Patent Application No. 21 164 041.2 filed on Mar. 22, 2021, the contents of which are incorporated herein by reference in their entirety.

FIELD AND BACKGROUND OF THE INVENTION

The present invention relates to an imaging device for a medical imaging system, a medical imaging system and a method for generating medical images.

Medical imaging systems, such as robotic medical imaging systems, allow displaying and recoding of images during a medical procedure. However, different procedures and/or individual preferences may require specific image and environmental settings. For example, fluorescence imaging requires a camera system adapted to the wavelength of the radiated fluorescent light as well as the respective room to be darkened. Consequently, different procedures and/or individual preferences may result in the use of different imaging devices as well as a need for different room settings. Therefore, the efforts for an availability of several imaging devices and for setup work tasks increases.

SUMMARY OF THE INVENTION

Accordingly, it is an object of the present invention to provide an imaging device for a medical imaging system, a medical imaging system with such imaging device and a method for generating medical images with enhanced imaging options.

The object is solved by an imaging device for a medical imaging system according to claim 1, a medical imaging system according to claim 9, and a method for generating medical images according to claim 14. Further aspects of the present invention are subject of the dependent claims.

According to one aspect of the present invention, an imaging device for a medical imaging system comprises at least one first photosensitive imaging member, at least one second photosensitive imaging member, and an optical element. The optical element is configured to route an incoming image to the first photosensitive imaging member and/or the second photosensitive imaging member.

With respect to the above configuration, the imaging device is capable of selectively or simultaneously receiving images via the first photosensitive imaging member and/or the second photosensitive imaging member. For example, the first photosensitive imaging member and/or the second photosensitive imaging member may be provided by one or more CCD-chips or a CCD-chip array, respectively. Alternatively, an active pixel sensor (CMOS) may be used as first photosensitive imaging member and/or second photosensitive imaging member.

In some embodiments, the optical element is a beam splitter and/or movable between a position in an optical path of the incoming image and a position outside of the optical path.

For example, the beam splitter may be a semi-transparent mirror or formed by two prisms attached to each other at their respective basis. With the optical element being positioned in the optical path of the incoming image, the incoming image may be routed simultaneously to the first photosensitive imaging member and/or the second photosensitive imaging member according to a splitting characteristic of the beam splitter. The position of the beam splitter in the optical path of the incoming image or the beam splitter as such may be configured to occupy the optical path entirely or only partially. With respect to the latter, the beam splitter may be configured as a reflecting optical element to route a respective portion of the incoming image to one of the first or second photosensitive members. Further, with the optical element being movable between a position in the optical path of the incoming image and a position outside of the optical path, the imaging device is capable of also selectively routing the incoming image to the first photosensitive imaging member and/or the second photosensitive imaging member. A respective movement may also allow the adaption of a splitting ratio between the first photosensitive imaging member and the second photosensitive imaging member.

The movement of the optical element may be provided as translational movement and/or rotational movement. Alternatively or in addition to a rotational movement of the optical element to move the optical element—at least partially—in and out of the optical path of the incoming image, the optical element may be configured to be rotatable about an axis with a predetermined angle to the optical path of the incoming image, preferably perpendicular to the optical path. According to such rotational angle, the incident angle of the optical path with respect to the reflecting and/or transmitting portions of the optical element may be adapted.

In some embodiments, the beam splitter is switchable between an active state to at least partially route the incoming image to the first photosensitive imaging member and the second photosensitive imaging member, and an inactive state to route the incoming image to the first photosensitive imaging member or the second photosensitive imaging member.

Accordingly, the beam splitter may be an electronically switchable beam splitter. For example, the electronically switchable beam splitter comprises an arrangement of single elements, like liquid crystals, whose reflecting and transmitting properties may be changed according to an applied electrical signal. In an active state, the applied electrical signals at least partially cause the incoming image to be routed to the first and second photosensitive imaging members. In an inactive state, the applied electrical signals or the absence of any electrical signal causes the incoming image to be only route to one of the first and second photosensitive imaging members. Such electronically switchable beam splitter may be an electronically switchable dichroitic mirror as an exemplary embodiment.

In some embodiments, the beam splitter is a wavelength-selective optical element.

Accordingly, partially routing the incoming image to the first photosensitive imaging member and/or the second imaging member is wavelength dependent. For example, wavelength in the visible region may be transmitted to the first photosensitive imaging member while wavelengths in the non-visible region, like ultraviolet, fluorescent and/or hyperspectral wavelengths, are reflected to the second photosensitive imaging member. Alternatively, the beam splitter may configured as a polarizing beam splitter or may split an incoming beam according to a predetermined ratio, e.g. 50:50, 40:60, 30:70 or the like. The beam splitter may also be configured to provide angle dependent splitting characteristics. Further, the splitting characteristics of the beam splitter may be adaptable. For example, the beam splitter with angle dependent splitting characteristics may be rotated about an axis perpendicular to the optical path to change its respective splitting characteristic.

The splitting characteristics of the beam splitter may be provided by the material of the beam splitter body and/or respective coatings. As described above, the splitting characteristics may also be provided and adaptable in accordance to applied electrical signals in an electronically controllable configuration.

The beam splitter may also provide a combination of different beam splitting characteristics. In particular, the beam splitter may provide different areas with different beam splitting characteristics, wherein one of the different areas may be selected to be positioned in the optical path according to respectively required splitting characteristic. Such splitting characteristic relates, for example, to a ratio, a wavelength range and/or other splitting options for an incoming image to be routed to the first and/or second photosensitive imaging member.

In some embodiments, the first photosensitive imaging member provides an imaging spectrum different from the second photosensitive imaging member.

Accordingly, the first photosensitive imaging member is or may be controlled to provide at least one imaging capability different from at least one imaging capability of the second photosensitive imaging member. The different imaging spectra or imaging capabilities, respectively, may relate to the sensitivity with respect to specific wavelengths and/or imaging settings like the number of pixels, aspect ratios, pixel size, arrangement or pattern of color pixels, color versus black-and-white and/or imaging frequencies (FPS).

Due to the different imaging spectra of the first photosensitive imaging member and the second photosensitive imaging member two different images may be recorded and/or transmitted to an image processing unit, as described later, and/or display with one imaging device.

In some embodiments, the first photosensitive imaging member is a color imaging member and the second photosensitive imaging member is a black and white imaging member for light outside a visible range or a color imaging member with higher sensitivity for predetermined colors.

For example, the first photosensitive imaging member is a color imaging member for white light comprising four color pixel. The second photosensitive imaging member may be a black and white imaging member sensitive to an ultraviolet, a fluorescence or a hyperspectral wavelength range. Alternatively, the second photosensitive imaging member may be a color imaging member with an enhanced sensitivity for red tones.

In some embodiments, a filter device is arranged between the optical element and the first photosensitive imaging member and/or the optical element and the second photosensitive imaging member.

The respective filter device or filter devices, respectively, between the optical element and the first and/or second photosensitive imaging member may be configured to filter undesired wavelengths to reduce noise. Alternatively or in addition, the respective filter device may be configured to provide the respective first and/or second photosensitive imaging member with a predetermined wavelength range in accordance with predetermined imaging settings. For example, if the first photosensitive imaging member may be intended to record only red colors in one application setting. Accordingly, the filter device between the optical element and the first photosensitive imaging member is configured to transmit only wavelengths in the respective wavelength range, e.g. between 650 nm and 750 nm. Alternatively or in addition, the first photosensitive imaging member may be controlled to deactivate any portions of the first photosensitive imaging member sensitive to any color but red.

The respective filter device may be arranged as separate device between the optical element and the first photosensitive imaging member and/or the second photosensitive imaging member. Alternatively, the respective filter device may be provided by the first and/or second photosensitive imaging member. In particular, the respective filter device differs from a filter element that may be conventionally used to filter wavelengths below 430 nm to avoid activation of pixels and imaging of false colors by such wavelengths. Accordingly, the respective filter device is adapted to provide filter characteristics beyond the conventional imaging equipment. With respect to the separate arrangement of the filter device, conventional imaging devices may be retrofitted. Alternatively, a conventional filter may be replaced by a respective filter device.

In some embodiments, the filter device comprises at least two filters and the filter device is configured to allow a change of the position of the filters to selectively provide different filter characteristics.

For example, the filter device may be configured as a revolver head unit with at least two filters arranged around a rotational axis of a revolver head. The at least two filters provide different filter characteristics and may be rotated manually and/or by a drive in front of the corresponding first or second photosensitive member on demand in dependence of the required filter characteristic. According to another example, the at least two filters may be arranged in different axial positions with respect to the rotational axis of the revolver head and configured to be rotated manually and/or by a drive independently from each other in front of the corresponding first or second photosensitive member. In such configuration, the filters may be selectively or simultaneously positioned in front of the corresponding first or second photosensitive member. In a configuration with the at least two filters positioned simultaneously in front of the corresponding first or second photosensitive member, the filters do not necessarily have to overlap entirely but may also overlap only partially.

According to a further aspect of the present invention, a medical imaging system comprises at least one imaging device as described above and an image processing unit. The image processing unit is configured to receive images from the first photosensitive imaging member and the second photosensitive imaging member.

The imaging processing unit may be integrated in the at least one imaging device or provided as separate unit. The imaging processing unit may comprise a control unit to control at least one operating function of the imaging device. Similarly, the imaging processing unit may be integrated in a control unit of the at least one imaging device or the imaging system. A respective control unit may be configured to control the first photosensitive imaging member and/or the second photosensitive imaging member and/or a corresponding filter device or corresponding filter devices and/or the optical element. In particular, the control device may be configured to control the aforementioned components of the imaging device independently. Further, the image processing unit may be configured or controlled to process images received from the first photosensitive and the second photosensitive imaging member independently from each other.

Accordingly, different images may be recorded and/or displayed by one imaging device of the imaging system. The imaging system may further provide the ability to independently control the respective first and second photosensitive imaging members and/or transmission means in the optical path, like the optical element and/or filter devices, to adapt the images to be received according to application requirements or individual preferences. Furthermore, the image processing of the images received by the image processing unit may be also independently controlled to achieve desired effects.

Alternatively or in addition, the image processing unit is capable of combining images from the first photosensitive imaging member and the second photosensitive imaging member.

The combination of images of the first photosensitive imaging member and the second photosensitive imaging member relates to a sampling of image data from both image sources, i.e. the first photosensitive imaging member and the second photosensitive imaging member. Such combination may be provided alternatively or in addition to the separate image processing of the images received, as indicated above. For example, a display device may display an image recorded by the first photosensitive imaging member, an image recorded by the second photosensitive imaging member and a combined image based on the image data recorded by the first photosensitive imaging member and the second photosensitive imaging member.

The combined image may be a processed sampling of all image data provided by the first and second photosensitive imaging members or may be based on only some of the image data provided by the first and second photosensitive imaging members. For example, the first photosensitive imaging member configured as a color imaging member provides color image data while the second photosensitive imaging member configured as a black and white imaging member sensitive for fluorescence light provides fluorescence image data. The image processing unit is configured to combine the respectively received image data to one image reproducing a color image with fluorescent artefacts. The image processing unit may further be configured to apply different weight factors to different types of image data. Such weight factors may be adaptable, e.g. via an input device as a graphical user interface. Due to the weight factors, an intensity of a predetermined color or a reproduction of a color depending on predetermined intensity thresholds may be adaptable.

Alternatively or in addition to the combination of images by the image processing unit, the image processing unit may be configured to process and/or assess images independently. For example, color images provided by the first photosensitive imaging member are processed to be displayed to an operator. Further, images of the second photosensitive imaging member, configured as hyperspectral camera, are continuously recorded and the image processing unit or a respective control unit receiving respectively processed images is configured to identify a tumor or respective indications. The identification may be based on predetermined algorithms, artificial intelligence and/or according to a predetermined wavelength received. If a tumor or a respective indicator is identified, the image processing unit or the respective control unit may be configured to display a notification of such identification. Such notification may be implemented by a text, symbol and/or a graphical representation of such artefact, e.g. by border around the affected area.

In some embodiments, the control unit is configured to control an exposure time and/or an exposure rate of the first photosensitive imaging member and/or the second photosensitive imaging member, or the first photosensitive imaging member and the second photosensitive imaging member provide an exposure time and/or an exposure rate different from each other.

Higher exposure times may allow the use of a lower lighting intensity. This may be advantageously applied to fluorescence image data. However, other image data may require lower exposure times. Accordingly, different exposure times may allow to adapt the imaging settings according to favorable requirements for the capture of different image data by the first and second photosensitive imaging members.

As another example, the exposure rate may affect to the number of images recordable within a given time. Some application may require a higher exposure rate than others. Consequently, the exposure rate may be reduced for one of the photosensitive imaging members. A reduced exposure rate may allow higher exposure times, which may allow lower lighting intensities as already indicated above.

Further, it may be advantages to use different resolutions for the first and second photosensitive imaging devices. For example, reading a 60 MP image from a memory and/or transferring such data takes longer with respect to a 5 MP image. Accordingly, the exposure rate may be differently, while the exposure time may be the same. However, the exposure time may also be different in consideration of a brightness-sensitivity. According to the given example, the 60 MP photosensitive imaging member provides a higher brightness-sensitivity than the 5 MP photosensitive imaging member. Due to the lower exposure rate the exposure time may be shortened to avoid an overexposure.

In some embodiments, the image processing unit is capable of assigning respective images of a lower exposure rate and/or higher exposure time of the first photosensitive imaging member or the second photosensitive imaging member to a plurality of images of a higher exposure rate and/or lower exposure time of the respective other photosensitive imaging member.

For example, the first photosensitive imaging member is a color imaging member and the second photosensitive imaging member is a black and white imaging member sensitive for fluorescence light. In order to reduce the lighting intensity for fluorescence light to be received by the second photosensitive imaging member, the exposure time for the second photosensitive imaging member is doubled and the respective exposure rate is halved in comparison to the first photosensitive imaging member. In other words, the first photosensitive imaging member records twice as many images as the second photosensitive imaging member within the same time. To combine the image data of the first and second photosensitive imaging members with different exposure times and exposure rates, the image processing unit is configured to assign one image or respective image data of the second photosensitive imaging member to two subsequent images of the first photosensitive imaging member.

In some embodiments, the imaging system comprises at least two imaging devices, and the image processing device is capable of combining images of the first photosensitive imaging members and/or the second photosensitive imaging members of the respective imaging devices. Preferably, the images of the first photosensitive imaging members and/or the second photosensitive imaging members of the respective imaging devices are provided to the image processing unit via one input cable.

Due to the use of at least two imaging devices, images may be recorded from different view angles and processed by the image processing unit to generate three-dimensional images. The processed image data may also be used for augmented reality applications.

According to a further aspect of the present invention, a method for generating medical images comprises the steps of routing an image via an optical element to a first photosensitive imaging member and a second photosensitive imaging member, providing image data of a different imaging spectrum by each of the first photosensitive imaging member and the second photosensitive imaging member, and combining the image data to a combined image.

The combination of the image data received by the first photosensitive imaging member and the second photosensitive imaging member corresponds to the image processing be the image processing unit as described above.

In some embodiments, the method further comprises assigning different exposure times and/or exposure rates to the first photosensitive imaging member and the second photosensitive imaging member.

With respect to examples and advantages, reference is made to the assignment already described with respect to the imaging system.

Further advantages, aspects and details of the disclosure are subject to the claims, the following description of preferred embodiments applying the principles of the disclosure and drawings. In the figures, identical reference signs denote identical features and functions.

DESCRIPTION OF SPECIFIC EMBODIMENTS OF THE INVENTION

Figure 1:
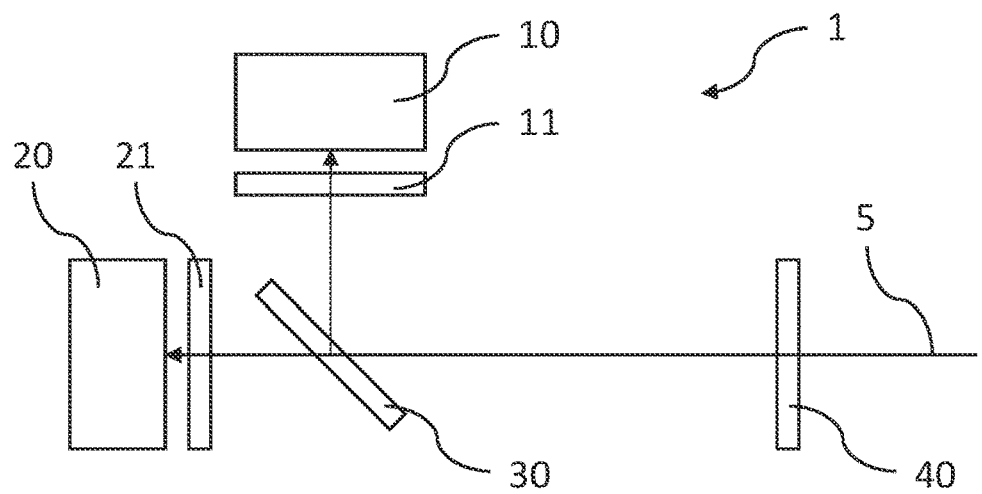
FIG. 1 is a schematic cross-sectional view of an image device and optical path of an incoming image according to an exemplary embodiment.

FIG. 1 shows a schematic cross-sectional view of an image device 1 and optical path 5 of an incoming image according to an exemplary embodiment. The incoming image passes through an objective 40 and is directed to an optical element 30. Here, the optical element 30 is a semi-transparent wavelength-selective mirror, configured to reflect wavelengths in the visible region to a first photosensitive imaging member 10 and to transmit wavelengths in the non-visible region to a second photosensitive imaging member 20. However, in alternative embodiments, the optical element may not be wavelength-selective and a wavelength-selection of wavelengths to be received by a photosensitive imaging member may be provided by filter devices arranged between the optical element and respective photosensitive imaging member, as described later. The semi-transparent parallel surfaces of the optical element 30 are tilted by 45° with respect to a plane perpendicular to the optical path 5 extending from the objective 40. In other words, an end of the optical element 30 facing the objective 40 forms an angle of 45° with the incoming optical path 5. The semi-transparent surface of the optical element 30 facing the objective is defined as facing side of the optical element. Alternatively to the semi-transparent wavelength-selective mirror, an optical element splitting the incoming beam into two beams with a predetermined intensity ratio, e.g. 50:50, may be used. However, with the first and second photosensitive imaging members providing different imaging spectra, as described later, a semi-transparent wavelength-selective mirror may provide higher intensities for the first and second photosensitive imaging members in accordance with a respective imaging spectrum.

An imaging side of first photosensitive imaging member 10 is facing the facing side of the optical element 30. The imaging side of first photosensitive imaging member 10 is arranged perpendicular to the beam reflected by the optical element 30. The first photosensitive imaging member 10 is a CMOS sensor for white light with four color pixels. A first filter device 11 is disposed in the optical path 5 of the reflected beam between the optical element 30 and the first photosensitive imaging member 10. The first filter device 11 comprises a filter configured to filter wavelengths that may cause noise with respect to the image data to be recorded by the first photosensitive imaging member 10. In alternative embodiments, as already addressed above, the first filter device may not only reduce noise but may be configured as a wavelength-selective member as such.

An imaging side of the second photosensitive imaging member 20 is facing the side of the optical element 30 opposed to the facing side of the optical element 30. The imaging side of the second photosensitive imaging member 20 is arranged perpendicular to the beam transmitted by the optical element 30. The second photosensitive imaging member 20 is a black and white CMOS-sensor sensitive for fluorescence light. For example, the emission spectrum of 5-ALA (aminolevulinic acid) is in a range of 600 nm to 750 nm, of ICG (incocyanine green) in a range between 750 nm to 950 nm, and of fluorescein of about 520 nm. Here, the second photosensitive imaging member 20 is configured to be sensitive to 5-ALA fluorescence. However, in alternative embodiments, other sensitivities may be provided depending on the respective emission spectrum. In particular, the second photosensitive imaging device may be configured to provide a broad wavelength photosensitivity to be applicable for a broad range of applications.

Similar to the first filter device 11, a second filter device 21 is disposed in the optical path 5 of the transmitted beam between the optical element 30 and the second photosensitive imaging member 20. The second filter device 21 comprises a filter configured to filter wavelengths that may cause noise with respect to the image data to be recorded by the second photosensitive imaging member 20. With respect to 5-ALA fluorescence, the second filter device 21 is configured to transmit wavelength within a range of 630 nm+/−15%, representing an emission maximum of 5-ALA. Accordingly, a wavelength selection is provided by the second filter device that does not only reduce noise but also cut-off wavelengths not intended to be images, irrespective of a further photosensitivity of the second photosensitive imaging member 20.

In alternative embodiments, the first and/or second filter device may be configured as a revolver head unit with several filters arrangeable around a rotational axis of a revolver head. The filters may also be arrangeable in different axial positions with respect to the rotational axis of the revolver head. Accordingly, different filters may be exchangeable and may be selectively or simultaneously arranged in front of the respective photosensitive imaging member. Due to the use of different filters, the imaging spectrum of the photosensitive imaging members may be adapted. Similarly, the photosensitive imaging members may be electronically controlled to adapt a respective imaging spectrum. For example, the photosensitive imaging member may provide several different pixels in an array that may be activated or deactivated in correspondence with a predetermined imaging spectrum.

Figure 2:
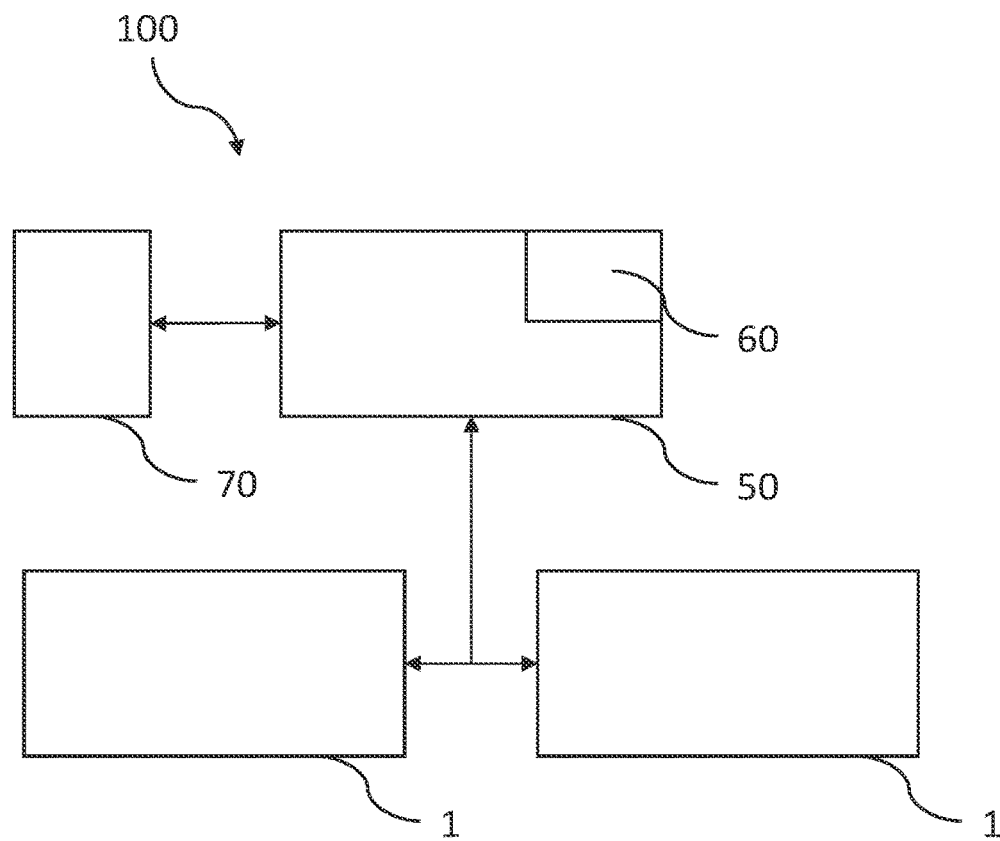
FIG. 2 is a schematic view of an exemplary imaging system comprising two imaging devices according to FIG. 1.

FIG. 2 is a schematic view of an exemplary imaging system 100 comprising two imaging devices 1 according to FIG. 1. The imaging system 100 further comprises an image processing unit 50, a control unit 60 and a display unit 70.

The control unit 60 is configured to control the image processing unit 50, the display unit 70 and the imaging devices 1. Here, the control unit 60 is provided together with the image processing unit 50. In alternative embodiments, the control unit may be provided as or by a separate unit. With respect to the signal connections, indicated by the solid double arrows in FIG. 2, image data of the imaging devices 1 is transmitted to the image processing unit 50. In turn, the image processing unit 50 or the control unit 60, respectively, transmits control signals to the imaging devices 1. The control signals may comprise image settings like exposure times and/or exposure rates or drive signals for a movement of the imaging devices. According to the present embodiment, the data transfer between the imaging devices 1 and the image processing unit 50 or control unit 60, respectively, is implemented by a single cable branched to each of the imaging devices 1. Alternatively or in addition, data transfer may be provided wirelessly according to other exemplary embodiments. Further, the image data processed by the image processing unit 50, as described later, is transferred to the display unit 70. The image data may be accompanied by further display control signals. According to the exemplary embodiment, the display unit 70 comprises a touchscreen to also serve as input device for control commands to be transferred to the image processing unit 50 or control unit 60, respectively.

Each of the imaging devices 1 is oriented in a predetermined orientation with respect to an object to record images thereof. The predetermined orientations correspond to a recording of images suitable for generating three-dimensional images of the object by processing the image data of each of the imaging devices 1 transferred to the image processing unit 50. Accordingly, the image processing unit 50 is configured to combine the image data received by the imaging devices 1 to generate a three-dimensional image. The image processing unit 50 transmits such three-dimensional image to the display unit 70 to be displayed. In alternative embodiments, a three-dimensional image may be provided by directing images of the respective imaging devices to different display areas, e.g. an imaging display area of a head-mounted display representing a left eye and an imaging display area of the head-mounted display system representing a right eye. The image processing unit 50 and the display unit 70 are also configured to display two-dimensional images according to the processed data of the imaging devices alternatively or in addition in response to the display settings or a respective input by an operator.

Further, the image processing unit 50 is configured to process image data of the first and second photosensitive imaging members 10, 20 of each of the imaging devices 1 to generate a combined image of the process image data of the first and second photosensitive imaging members 10, 20 of each of the imaging devices 1. If two-dimensional images are intended to be displayed in addition or alternatively to three-dimensional images, the image processing unit 50 processes the image data of the respective images devices 1 separately to generate a combined image of each of the imaging devices 1. The respectively processed image data may be processed further to be combined to provide a three-dimensional image, if required. However, if only a three-dimensional image has to be displayed, the image processing unit 50 is configured to process the image data of both imaging devices 1 at once. Additionally, the image processing unit 50 is configured to process the data of the first photosensitive imaging member 10 and/or the second imaging member 20 of each or only one of the imaging devices 1 according to respective display settings. In principle, each processing with respect to any display settings or displaying images in general may also apply for storing images alternatively or in addition, e.g. for documentation purposes.

According to the exemplary embodiment with the first photosensitive imaging member 10 of each of the imaging devices 1 being a CMOS-sensor for white light and the second photosensitive imaging member 20 of each of the imaging devices 1 being a black and white CMOS-sensor sensitive for fluorescence light, the control unit 60 controls an exposure time for each of the first and second photosensitive imaging members 10, 20. To reduce the required light intensity for fluorescence images, the exposure time of the second photosensitive imaging members 20 is controlled to be twice the exposure time of the first photosensitive imaging members 10. The control unit 60 is configured to control the exposure times such that two images by the first photosensitive imaging member 10 and one image by the second photosensitive imaging member 20 are captured in one time interval. Accordingly, the image processing unit 50 is configured to assign the image data of the one image captured by the second photosensitive imaging member 20 to each of the image data of the two images captured by the first photosensitive imaging member 10 in such time interval to generate combined images. In alternative embodiments, the control device may be configured to adapt the exposure times of the first and second photosensitive imaging members 10, 20 to be equal to each other or three times, four times or otherwise different from each other.

In summary, the imaging system 100 according to the exemplary embodiment is capable of displaying and/or storing images of each of the first and second photosensitive imaging members 10, 20 of the imaging devices 1 separately, combined images of the first and second photosensitive imaging members 10, 20 of each of the imaging devices 1, combined images of images of the first and/or second photosensitive imaging members 10, 20 of one imaging device 1 combined with images of the first and/or second photosensitive imaging members 10, 20 of the other imaging device 1.

It is to be noted that the given examples are specific embodiments and not intended to restrict the scope of protection given in the claims. In particular, single features of one embodiment may be combined with another embodiment. As an example, even though the imaging devices according to the exemplary embodiment provide the same configuration, the present invention is not limited thereto. The first and/or second photosensitive imaging members of one imaging device may differ from the first and/or second photosensitive imaging members of the other imaging device or may be controlled differently. Further, the imaging system is not restricted to providing two imaging devices but may also comprise only one or more than two imaging devices. In another variant, at least one imaging device may comprise an image pre-processing unit to allow a reduction of the amount of signals to be transmitted to an external processing unit to a required minimum.

LIST OF REFERENCE SIGNS 1 imaging device
5 optical path 10 first photosensitive imaging member
11 first filter device
20 second photosensitive imaging member
21 second filter device
30 optical element
40 objective
50 image processing unit
60 control unit
70 display unit
100 imaging system

What is claimed is:

1. An imaging device for a medical imaging system, comprising:
    at least one first photosensitive imaging member,
    at least one second photosensitive imaging member, and
    an optical element,
    wherein the optical element is configured to route an incoming image to the first photosensitive imaging member and/or the second photosensitive imaging member,
    wherein a filter device is arranged between the optical element and the first photosensitive imaging member and/or the optical element and the second photosensitive imaging member, and
    wherein the filter device comprises at least two filters and the filter device is configured to allow a change of the position of the filters to selectively provide different filter characteristics.

2. The imaging device according to claim 1, wherein the optical element is a beam splitter and/or movable between a position in an optical path of the incoming image and a position outside of the optical path.

3. The imaging device according to claim 2, wherein the beam splitter is switchable between an active state to at least partially route the incoming image to the first photosensitive imaging member and the second photosensitive imaging member, and an inactive state to route the incoming image to the first photosensitive imaging member or the second photosensitive imaging member.

4. The imaging device according to claim 2, wherein the beam splitter is a wavelength-selective optical element.

5. The imaging device according to claim 1, wherein the first photosensitive imaging member provides an imaging spectrum different from the second photosensitive imaging member.

6. The imaging device according to claim 5, wherein the first photosensitive imaging member is a color imaging member and the second photosensitive imaging member is a black and white imaging member for light outside a visible range or a color imaging member with higher sensitivity for predetermined colors.

7. A medical imaging system, comprising:
    at least one imaging device according to claim 1 and
    an image processing unit,
    wherein the image processing unit is configured to receive images from the first photosensitive imaging member and the second photosensitive imaging member.

8. The medical imaging system according to claim 7, wherein the image processing unit is capable of combining images from the first photosensitive imaging member and the second photosensitive imaging member.

9. The medical imaging system according to claim 7, wherein the imaging system further comprises a control unit to control an exposure time and/or an exposure rate of the first photosensitive imaging member and/or the second photosensitive imaging member, or wherein the first photosensitive imaging member and the second photosensitive imaging member provide an exposure time and/or an exposure rate different from each other.

10. The medical imaging system according to claim 9, wherein the image processing unit is capable of assigning respective images of a lower exposure rate and/or higher exposure time of the first photosensitive imaging member or the second photosensitive imaging member to a plurality of images of a higher exposure rate and/or lower exposure time of the respective other photosensitive imaging member.

11. The medical imaging system according to claim 7, wherein the imaging system comprises at least two imaging devices, and wherein the image processing device is capable of combining images of the first photosensitive imaging members and/or the second photosensitive imaging members of the respective imaging devices, preferably provided to the image processing unit via one input cable.

12. A method for generating medical images by a medical imaging system according to claim 7, the method comprises:
    routing an image via an optical element to a first photosensitive imaging member and a second photosensitive imaging member,
    providing image data of a different imaging spectrum by each of the first photosensitive imaging member and the second photosensitive imaging member, and
    combining the image data to a combined image.

13. The method according to claim 12, wherein the method further comprises assigning different exposure times and/or exposure rates to the first photosensitive imaging member and the second photosensitive imaging member.

14. An imaging device for a medical imaging system, comprising:
    at least one first photosensitive imaging member,
    at least one second photosensitive imaging member, and
    an optical element,
    wherein the optical element is configured to route an incoming image to the first photosensitive imaging member and/or the second photosensitive imaging member,
    wherein the optical element is a beam splitter, and
    wherein the beam splitter is switchable between an active state to at least partially route the incoming image to the first photosensitive imaging member and the second photosensitive imaging member, and an inactive state to route the incoming image to the first photosensitive imaging member or the second photosensitive imaging member.

15. The imaging device according to claim 14, wherein the beam splitter is a wavelength-selective optical element.

16. The imaging device according to claim 14, wherein the first photosensitive imaging member provides an imaging spectrum different from the second photosensitive imaging member.

17. The imaging device according to claim 16, wherein the first photosensitive imaging member is a color imaging member and the second photosensitive imaging member is a black and white imaging member for light outside a visible range or a color imaging member with higher sensitivity for predetermined colors.

18. The imaging device according to claim 14, wherein a filter device is arranged between the optical element and the first photosensitive imaging member and/or the optical element and the second photosensitive imaging member.

19. The imaging device according to claim 18, wherein the filter device comprises at least two filters and the filter device is configured to allow a change of the position of the filters to selectively provide different filter characteristics.

20. A medical imaging system, comprising:
at least one imaging device according to claim 14 and an image processing unit,
wherein the image processing unit is configured to receive images from the first photosensitive imaging member and the second photosensitive imaging member.

21. The medical imaging system according to claim 20, wherein the image processing unit is capable of combining images from the first photosensitive imaging member and the second photosensitive imaging member.

22. The medical imaging system according to claim 20, wherein the imaging system further comprises a control unit to control an exposure time and/or an exposure rate of the first photosensitive imaging member and/or the second photosensitive imaging member, or wherein the first photosensitive imaging member and the second photosensitive imaging member provide an exposure time and/or an exposure rate different from each other.

23. The medical imaging system according to claim 22, wherein the image processing unit is capable of assigning respective images of a lower exposure rate and/or higher exposure time of the first photosensitive imaging member or the second photosensitive imaging member to a plurality of images of a higher exposure rate and/or lower exposure time of the respective other photosensitive imaging member.

24. The medical imaging system according to claim 20, wherein the imaging system comprises at least two imaging devices, and wherein the image processing device is capable of combining images of the first photosensitive imaging members and/or the second photosensitive imaging members of the respective imaging devices, preferably provided to the image processing unit via one input cable.

25. A method for generating medical images by a medical imaging system according to claim 14, the method comprises:
routing an image via an optical element to a first photosensitive imaging member and a second photosensitive imaging member,
providing image data of a different imaging spectrum by each of the first photosensitive imaging member and the second photosensitive imaging member, and
combining the image data to a combined image.

26. The method according to claim 25, wherein the method further comprises assigning different exposure times and/or exposure rates to the first photosensitive imaging member and the second photosensitive imaging member.

\* \* \* \* \*